United States Patent [19]

Nevrekar

[11] Patent Number: 5,618,027
[45] Date of Patent: Apr. 8, 1997

[54] GATE VALVE

[76] Inventor: Venkatesh R. Nevrekar, 6 Castle Creek Pl., Shawnee, Okla. 74801

[21] Appl. No.: 459,321

[22] Filed: Jun. 2, 1995

Related U.S. Application Data

[63] Continuation-in-part of Ser. No. 276,986, Jul. 20, 1994.

[51] Int. Cl.$^6$ .................................................. F16K 3/00
[52] U.S. Cl. .............................. 251/302; 251/250.5
[58] Field of Search ................................ 251/162, 163, 251/164, 250, 250.5, 193, 192, 195, 298, 302

[56] References Cited

U.S. PATENT DOCUMENTS

| | | | |
|---|---|---|---|
| 1,695,014 | 12/1928 | Heggem | 251/163 |
| 2,263,617 | 11/1941 | Daniel | 251/250.5 X |
| 2,707,488 | 5/1955 | Overdijk | 251/304 X |
| 2,883,147 | 4/1959 | Mirza et al. | 251/172 |
| 3,123,334 | 3/1964 | Hitz | 251/147 |
| 3,404,864 | 10/1968 | Reddy | 251/172 |
| 4,253,485 | 3/1981 | Legille | 137/315 |
| 4,962,911 | 10/1990 | Soderberg | 251/159 |

FOREIGN PATENT DOCUMENTS

| | | | |
|---|---|---|---|
| 843262 | 8/1960 | United Kingdom | 251/250 |
| 1280053 | 7/1972 | United Kingdom | 251/302 |

*Primary Examiner*—John C. Fox

[57] ABSTRACT

A valve comprising a gate closure member which is actuated by a stem that is operatively connected with the valve operator handle at the upper end of the stem and the lower end of the stem connected to a toothed pinion engaging an arcuate toothed rack on the gate thereby rotating the gate, or to a toothed pinion engaging a linearly straight toothed rack on the gate thereby reciprocating the gate across the fluid flow-path in a direction transverse to the stem axis, an when the closure member is a tapered wedge gate, the stem is operatively connected with the valve operator handle by means of a Lift-and-Turn mechanism.

8 Claims, 5 Drawing Sheets

GATE VALVE

RELATED APPLICATIONS

This application is a continuation-in-part of U.S. patent application Ser. No. 08/276,986 filed on Jul. 20, 1994, entitled "ROTARY VALVE", the details of which are incorporated herein by reference.

BACKGROUND OF THE INVENTION

1. Field of the Invention

The present invention relates to gate valve assemblies in which the gate closure member reciprocates in a direction transverse to the stem axis.

2. Brief Description of Prior Art

Many valves have been taught in the prior art where the gate closure member has a sealing surface that wedges against the valve body seating surface in order to seal the fluid flow passageway, e.g. a tapered wedge gate valve, a tapered plug valve actuated by a Lift-and-Turn mechanism, an expanding wedge gate valve, etc.

A gate valve is generally understood to mean a valve in which the gate closure member reciprocates along the stem axis between the closed and open positions of the valve.

In a tapered wedge gate valve, a tapered wedge gate of solid cross section is wedged into like tapered valve body seats to sealingly close the fluid flow passageway. The tapered wedge gate is pulled away from the valve body seats along the stem axis in order to open the fluid flow passageway. In other words, the gate reciprocates along the stem axis between the open and closed positions of the valve and therefore sufficient space should be provided for in the valve body cavity for permitting the reciprocating movement of the gate along the stem axis. Since the gate is moved away from the valve body seats, the fluid flow passageway cannot be sealed from the valve body cavity in the valve open position. It is also well known that the stem packing around the stem is subject to more wear in a reciprocating stem than in a rotary stem.

So it would be advantageous to have a reciprocating gate valve that is actuated by a rotary stem, since the stem packing would last longer than in a valve actuated by a reciprocating stem.

A valve in which the gate reciprocates along the stem axis, requires plenty of space above the valve body in a vertical installation in order to accommodate the bonnet and the handwheel. This poses a big problem for vertical installations such valves in confines spaces. If the gate is made to reciprocate in a direction transverse to the stem axis, less vertical space will be needed above the valve body.

SUMMARY OF THE PRESENT INVENTION

The present invention is concerned with providing a valve assembly in which the gate closure member is actuated by a rotary stem for the advantages obtained therefrom.

A valve assembly comprises a valve body with a body cavity inside which is disposed a closure member to selectively open or close the fluid flow passageway through the valve body intersecting the valve body cavity. The closure member in the form of a gate is rotatable about the stem axis or about an offset axis parallel to the stem axis. The stem axis is disposed transverse to the fluid flow-path denoted by the fluid flow passageway. The stem is connected to the gate and actuates the gate to selectively open or close the fluid flow passageway. The valve body cavity is correspondingly shaped to closely surround the gate and to permit the gate to rotate about an axis transverse to the fluid flow-path or to permit the gate to reciprocate in a direction transverse to the stem axis.

In one embodiment of the present invention, the gate has an outside convex surface and an inside concave surface, both surfaces being concentric with each other and parallel to the stem axis. Fluid pressure in the fluid flow passageway upstream pushes the gate against the downstream seat to sealingly close the fluid flow passageway. The stem is connected to the gate by a connecting means by which the gate is permitted to move along the fluid flow path a limited extent when positioned in the flow closed position of the valve assembly and when the stem rotates, the gate and the stem rotate together.

In another embodiment, at least one of the convex and concave surfaces is inclined to the other. The fluid flow passageway is sealingly closed when the stem exerts force on the gate to cause the gate to wedge against the like tapered valve body seat or seats. In this embodiment, the connecting means between the stem and the gate is of two kinds. In one kind, the stem is integrally connected with the gate so that the stem and the gate move synchronously. The stem actuates the gate, and the stem is connected to the valve operator handle by means of a Lift-and-Turn mechanism whereby the gate reciprocates along the stem axis a limited extent during a limited interval of movement of the valve operator handle and permits the gate to rotate with the stem at a time of movement of the valve operator handle other than the limited interval. The reciprocating movement of the gate along the stem axis by a limited amount relieves wedging load on the valve body seats and facilitates rotation of the gate. In the other kind, the connecting means between the stem and the gate permits the stem to move in a sequence of steps whereby the stem moves away from the gate in order to relieve the gate of the stem force and then the stem rotates together with the gate when the valve operator handle is moved in one direction. The stem is connected to the valve operator handle by means of a Lift-and-Turn mechanism which permits the stem to reciprocate relative to the gate. When the valve operator handle is moved in the opposite direction, the stem rotates through a pre-determined interval of rotation and then moves axially towards the gate. The gate comprises a stop means to arrest further movement of the stem towards the gate so that the stem force is transmitted to the gate to obtain better sealing. In an extension of this embodiment, the inclined surface of the gate forms the surface of the frustum of a hollow cone rotating about a trunnion disposed on the valve body. In essence the hollow cone constitutes two wedge gates operating synchronously in opposite directions across the fluid flow-path, thereby providing sealing at 4 locations along the fluid flow-path.

In another embodiment of the present invention, the gate is rotated about an offset axis parallel to the stem axis. The lower end of the stem carries a pinion which meshes with the rack on the gate so that when the stem rotates, the pinion rotates the gate. With this rack-and-pinion arrangement between the gate and the stem, the gate can be made of a larger radius than the radius of the gate that is concentric with the stem, so that the gate can be rotated about an offset axis parallel to the stem axis. If the radius of the gate is made larger and larger, the gate then essentially becomes one which reciprocates in a linear direction transverse to the stem axis. The rack-and-pinion arrangement between the gate and the stem thus translates rotary movement of the stem into reciprocating movement of the gate. In fact, with the rack-and-pinion arrangement between the gate and the stem, the pinion can engage two identical gates at the same time oppositely disposed across the diameter of the pinion and causing the gates to move in opposite directions across the fluid flow path, thereby providing sealing at four locations along the fluid flow passageway. When the gate moves across the fluid flow-path, the gate sealing surfaces remain parallel to the valve body seating surfaces, and when the fluid flow conduit in the gate is aligned with the fluid flow passageway, the fluid flow conduit can be sealed from the valve body cavity by means of Lift-Turn-and-Reseat mechanism operatively connected between the stem and the valve operator handle. Thus with a gate that reciprocates across the fluid flow-path in a direction transverse to the stem axis, the valve body cavity can be sealed from the fluid flow passageway in the fluid flow closed position as well as in the fluid flow open position of the valve assembly. In an extension of this embodiment, the tapered wedge gate can be split into two identical halves which are oppositely disposed back to back in the two valve body seats. The pinion engages both half gates on opposite sides across the diameter thereby moving the gates across the fluid flow-path in opposite directions.

An object of the present invention is to provide a valve assembly in which the gate reciprocates in a direction transverse to the stem axis.

Another object of the present invention is to provide a valve assembly in which the gate rotates about an offset axis parallel to the stem axis.

A further object of the present invention is to provide a valve assembly in which the tapered wedge gate reciprocates across the flow-path in a direction transverse to the stem axis.

Another object of the present invention is to provide a valve assembly in which the valve body closely surrounds the gate so as to keep the dead cavity space in the valve body cavity to the absolute minimum.

Still another object of the present invention is to provide a valve assembly in which the gate is reciprocated by the actuation of a rotary stem.

Other objects and advantages of the present invention will become apparent as the following detailed description is read in conjunction with the accompanying drawings which illustrate certain preferred embodiments of the present invention.

DETAILED DESCRIPTION

Figure 1:
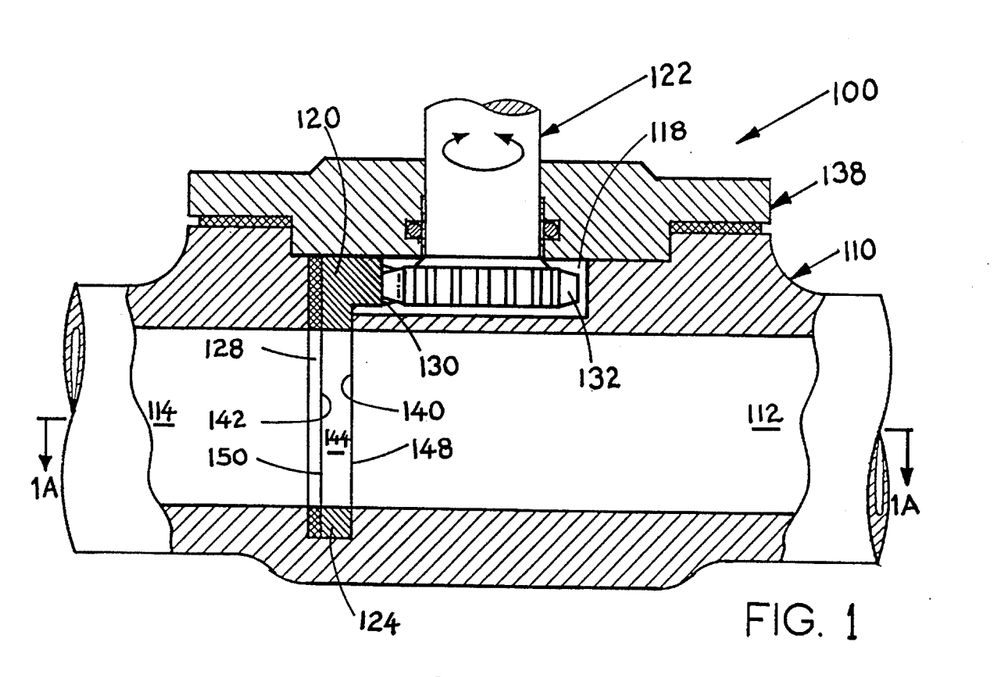
FIG. 1 is a partially detailed cross sectional view of a rotary gate valve structure constructed in accordance with the present invention.

With reference to FIG. 1, a rotary gate valve is shown as constructed in accordance with the present invention and the valve is shown in the open position.

The valve assembly 100 includes a valve body 110 having a fluid flow passageway 112–114 intersecting the body cavity 118. The body cavity 118 is in fluid communication with the fluid flow passageway 112–114 and is also open upwardly to one side of the valve body 110 to communicate with the interior of the bonnet 138. The valve body 110 comprises valve body seating surfaces 140, 142 facing each other across the body cavity 118, and are concentric with each other.

A flow control member 120 is disposed in the body cavity 118 and is actuated by the stem 122 to selectively open or close the fluid flow passageway 112–114. The flow control member 120 comprises a closure member 124 in the form of a cylindrical gate with an outer convex sealing surface 150 and an inner concave sealing surface 148 on the opposite side and facing the valve body seating surfaces 142, 140 respectively. The cylindrical gate 124 is rotatable about the axis of the stem 122. A cylindrical sleeve 128 of elastomeric material such as PTFE, is lined against the valve body cavity 118 and adjacent to the convex sealing surface 150 of the gate 124. The inner concave surface of the sleeve 128 forms the valve body seating surface 142. The gate 124 has a solid portion 125 to close the fluid flow passageway and an opening 144 alignable with the fluid flow passageway to open fluid flow. The valve body cavity 118 is shaped to closely surround the gate 124 and to permit the gate to rotate about the stem axis, so as to keep the dead cavity space in the valve body to the absolute minimum. This is particularly advantageous for sanitary applications.

The lower end of the stem 122 is connected to a toothed pinion 132 which engages the toothed arcuate rack 130 on the upper inside rim of the rotary gate 124. The valve operator handle (not shown) rotates the stem 122 which in turn rotates the pinion 132 and by virtue of the toothed engagement between the pinion and the gate, the gate 124 is also rotated through a pre-determined angle of rotation to selectively open or close the fluid flow passageway which denotes the fluid-flow path 112–114. When the solid portion 125 (FIG. 1A) of the gate 124 is in the fluid flow path, fluid pressure in the fluid flow passageway 112 acts on the concave surface 148 of the gate 124 and pushes the convex sealing surface 150 against the valve body seating surface 142 thereby sealingly closing the downstream fluid flow passageway 114. To open the fluid flow, the opening 144 in the gate 124 is aligned with the fluid flow-path 112–114 by actuating the stem 122. The valve body cavity can also be lined with the sleeve (not shown) on the concave side 148 of the gate 124 against the valve body seating surface 140, thereby making the valve bi-directional. The gate 124 is free to move along the fluid flow-path 112–114 a very limited extent due to the rack-and-pinion connection between the gate and the stem. Instead of the sleeve 128, other kinds of seating arrangement could be used, e.g. seat rings in the valve body surrounding the fluid flow passageway or sealing rings on the solid portion 125 of the gate 124, or the sleeve could be attached to the gate itself.

Figure 1A:
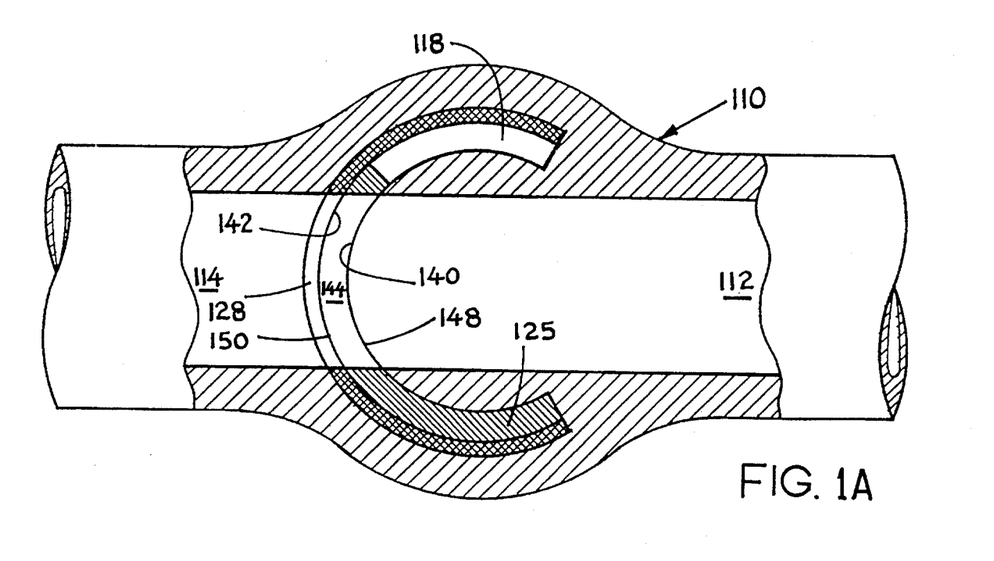
FIG. 1A is a partially detailed cross sectional view of the rotary gate valve in FIG. 1, generally taken along 1A—1A showing the valve in the open position.

In FIGS. 1, 1A the operating radius of the rack 130 is equal to the operating radius of the pinion 132, so that the gate 124 rotates about the stem axis. The radius of the rack 130 can be made larger than the pinion radius, so that the gate will rotate abut an axis offset to the stem axis. This permits the use of a larger gate for larger pipe diameter without increasing the size of the pinion. This way a larger gate can be used for larger size pipe diameters without proportionally increasing the overall size of the valve assembly. This is the main concept behind the present invention. In current practice with plug valves, the plug becomes very heavy for large diameter pipes and actuation of the plug becomes very difficult. So the plug types of closure members are restricted to small valves in which the plug rotates about the stem axis. The present invention has another advantage over the conventional solid plug valves in which there is pressure drop at two places along the fluid flow-path in the plug—one at the entrance to the conduit in the plug and the other at the exit. This is because the conduit in the plug also rotates with the plug. In the present invention, the pressure drop is at only one place, since the gate has a very thin cross section as compared to a conventional solid plug. The concept of using a larger rack radius than the radius of the pinion is more clearly shown later in FIGS. 4, 4A. When the rack radius is made infinite, the rack becomes linearly straight and the gate then reciprocates in a direction transverse to the stem axis. This is more clearly shown in FIGS. 5, 5A.

Figure 2:
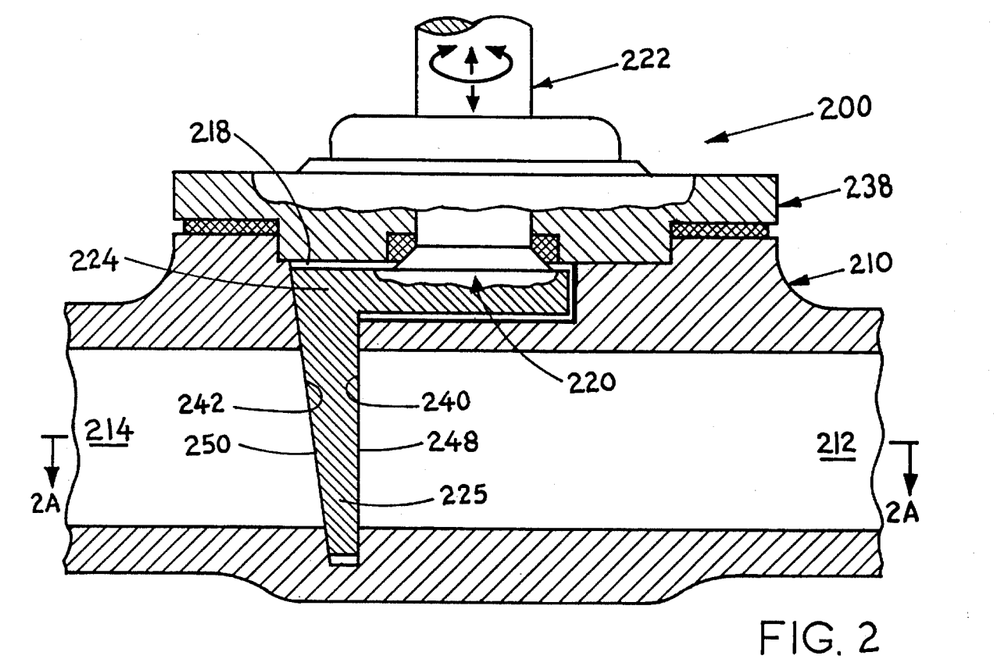
FIG. 2 is a partially detailed cross sectional view of a rotary wedge gate valve structure constructed in accordance with the present invention.
Figure 2A:
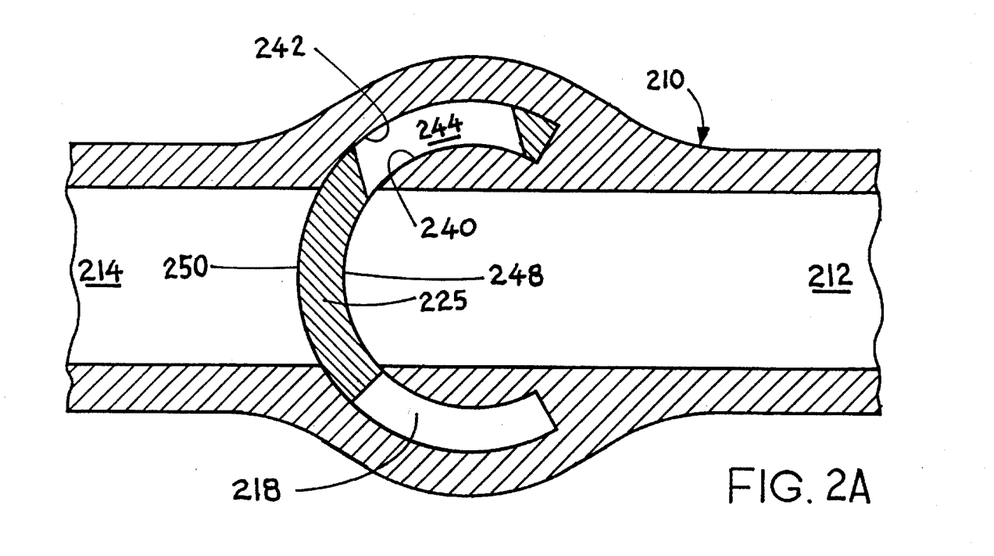
FIG. 2A is a partially detailed cross sectional view of the rotary wedge gate valve in FIG. 2, generally taken along 2A—2A showing the valve in the closed position.

In FIG. 2, 2A a rotary wedge gate valve is shown as constructed in accordance with the present invention and the valve is shown in the closed position.

The valve assembly 200 includes a valve body 210 having a fluid flow passageway 212–214 intersecting the body cavity 218 which is in fluid communication with the fluid flow passageway 212–214. The body cavity 218 is also open upwardly to one side of the valve body 210 to communicate with the interior of the bonnet 238. The valve body 210 comprises valve body seating surfaces 240, 242 facing each other across the body cavity 218, and are concentric with each other.

A flow control member 220 is disposed in the body cavity 218 and is actuated by the stem 222 to selectively open or close the fluid flow passageway 212–214. The flow control member 220 comprises a closure member 224 in the form of a wedge gate with an outer convex sealing surface 250 and an inner concave sealing surface 248 on the opposite side and facing the valve body seating surfaces 242, 240 respectively. The outer convex surface 250 is inclined to the inner concave surface 248 thereby making the wedge gate closure member 224 a part of the frustum of a hollow cone and is concentric with the stem 222. The gate 224 is rotatable abut the stem axis and has a solid portion 225 to close the fluid flow passageway and an opening 244 alignable with the fluid flow passageway to open the fluid flow. The valve body cavity 218 is shaped to closely surround the gate 224 and to permit the gate to rotate about the stem axis so as to keep the dead cavity space in the valve body cavity to the absolute minimum. This is particularly advantageous for sanitary applications.

The stem 222 is integrally connected with the wedge gate 224 so that the stem and the gate move together. The stem 222 is operatively connected with the valve operator handle (not shown) by means of a Lift-and-Turn mechanism whereby the stem is lifted a limited extent before rotating -when the valve operator handle is moved in one direction. When the valve operator handle is moved in the opposite direction, the stem rotates through a pre-determined interval of rotation and then moves axially causing the gate 224 to wedge against the valve body seating surfaces 240, 242 in order to sealingly close the fluid flow passageway 212–214. To open the fluid flow passageway, the gate is lifted and then rotated. Lifting of the gate before rotation, relieves the wedging load on the valve body seats and makes the rotation of the gate lot easier.

The gate 224 in FIGS. 2, 2A is bidirectional. However, when the fluid flow passageway 214 is located upstream, fluid pressure forces acting on the inclined surface 250 of the gate 224 have a vertical component of the force causing the gate to move away from the valve body seats along the stem axis, thereby facilitating rotation of the gate. The Lift-and-Turn mechanisms are of two kinds. In one kind, the stem which is integrally connected with the gate moves axially during a limited interval of movement of the valve operator handle and permits the gate to rotate with the stem at a time of movement of the valve operator handle other than the limited interval. In the other kind, the stem moves away from the gate to relieve the gate of the stem force and then rotates together with the stem when the valve operator is moved in one direction. The connecting means between the stem and the gate permits the stem to move axially relative to the gate. The gate comprises stop means to arrest further axial movement of the stem towards the gate so that the stem force is transmitted to the gate to obtain better sealing of the fluid flow passageway. There are many generic Lift-and-Turn mechanisms that can be used on the present invention. Generic Lift-Turn-and-Reseat mechanisms can also be used. Two such generic mechanisms are explained in great details in U.S. Pat. No. 5,407,176 by Nevrekar, and in U.S. Pat. No. 2,392,880 by I. N. Reed. Many other kinds of Lift-and-Turn mechanisms can be used, such as U.S. Pat. No. 5,342,028 by Nevrekar.

Figure 3:
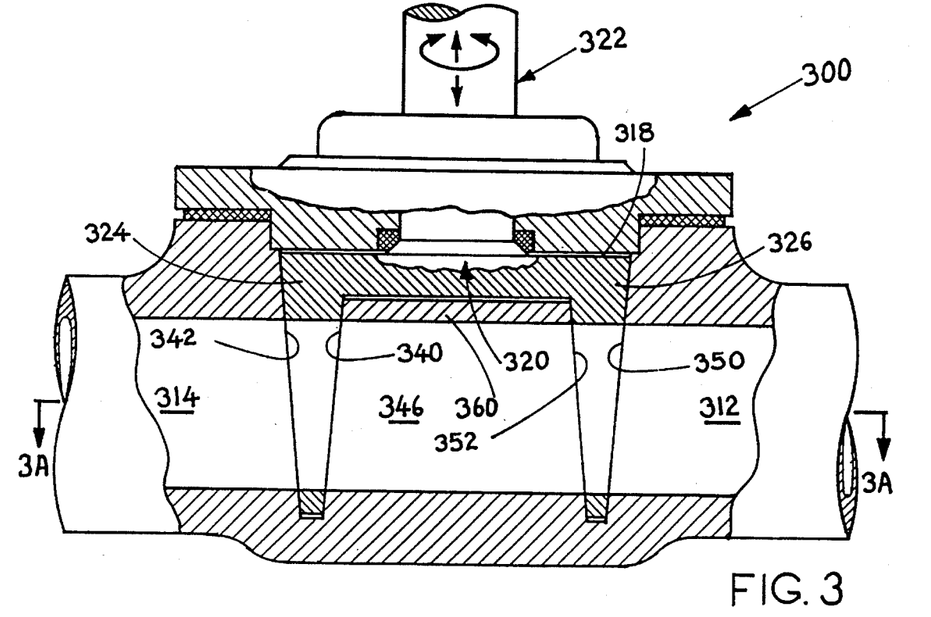
FIG. 3 is a partially detailed cross sectional view of a rotary double gate wedge valve structure constructed in accordance with the present invention.
Figure 3A:
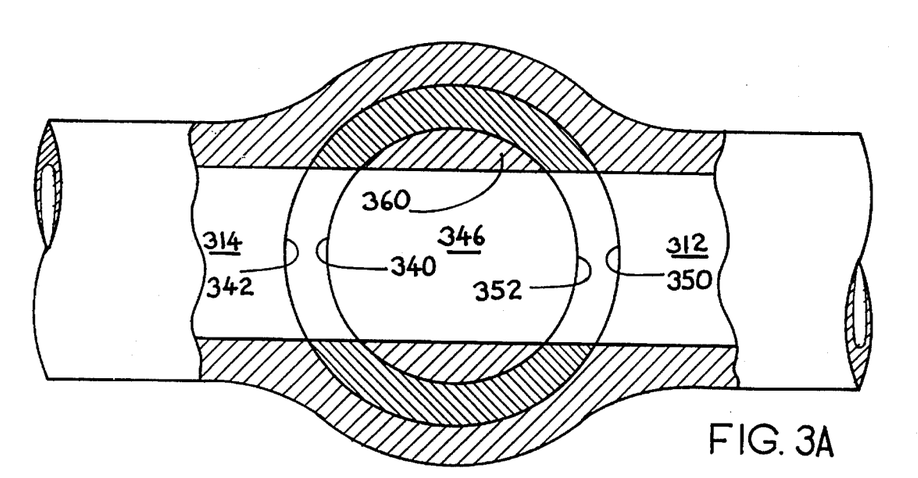
FIG. 3A is a partially detailed cross sectional view of the rotary double gate wedge valve in FIG. 3, generally taken along 3A—3A showing the valve in the open position.

In FIGS. 3, 3A another embodiment of the rotary wedge gate-valve is shown as constructed in accordance with the present invention and the valve is shown in the open position.

The valve assembly 300 is nearly identical to the valve assembly 200 in FIGS. 2, 2A, except that the valve assembly 300 comprises two identical gates 324 and 326 whereas the valve assembly 200 of FIGS. 2, 2A has only one gate 224. For the sake of brevity, only relevant details are explained for FIGS. 3, 3A.

The wedge gates 324 and 326 are disposed diametrically opposite to each other on the flow control member 320 which is actuated by the stem 322. The stem 322 is operatively connected with the valve operator handle (not shown) by means of a Lift-and-Turn mechanism or a Lift-Turn-and-Reseat mechanisms as explained for FIGS. 2, 2A. The wedge gate 324 wedges against the valve body seating surfaces 340, 342 and the wedge gate 326 wedges against the valve body seating surfaces 350, 352. So in effect sealing of the fluid flow passageway 312–314 from the valve body cavity 318 takes place at four locations along the fluid flow path, i.e. at the valve body seating surfaces 342, 340, 352 and 350. Because of the fully circular nature of the flow control member 320, machining of the valve body cavity 318 and the gates 324, 326 becomes much less expensive than in FIGS. 2, 2A. In essence, the flow control member 320 rotates over the trunnion 360 which comprises a fluid flow conduit 346 therethrough. The conduit 346 remains fixed, i.e. non-rotating with the gate, as compared to rotating conduit in a traditional solid plug valve, and the closure member basically comprises two gates which rotate synchronously in opposite directions across the fluid flow-path.

Figure 4:
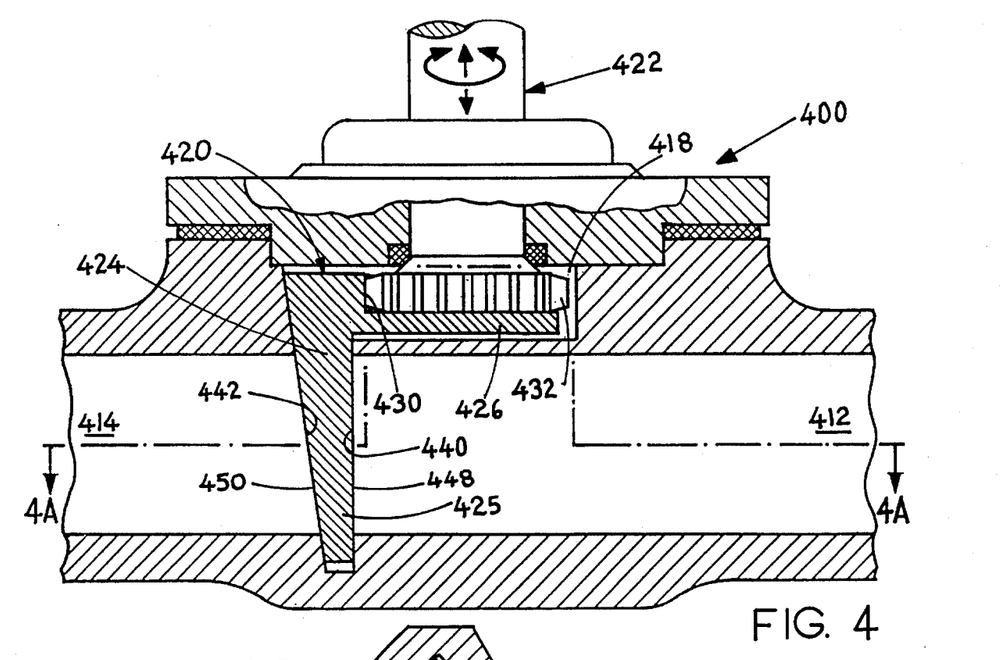
FIG. 4 is a partially detailed cross sectional view of a rotary wedge gate valve structure constructed in accordance with the present invention.
Figure 4A:
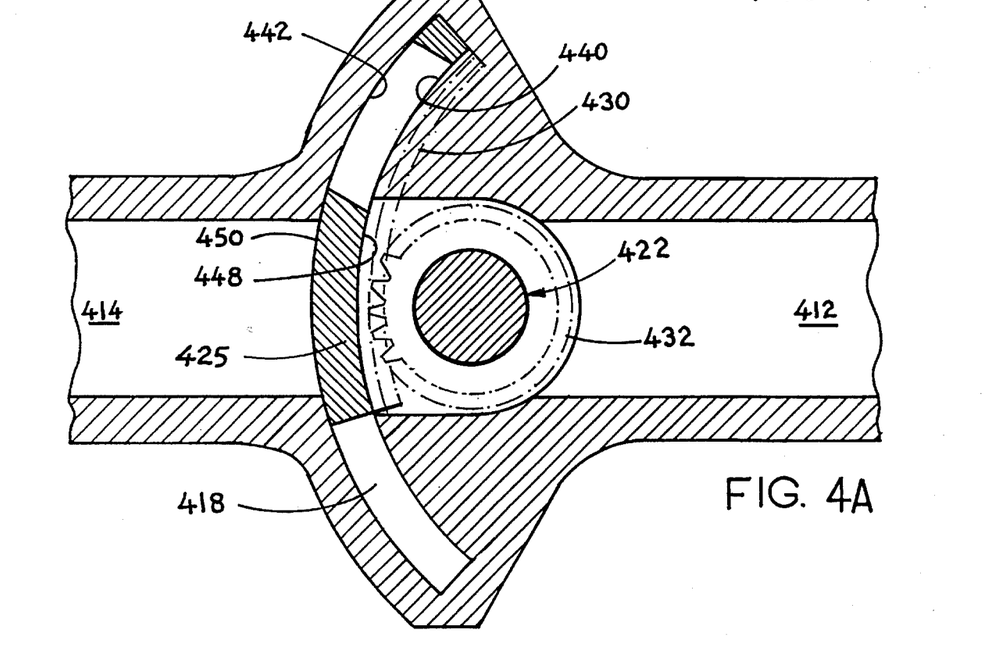
FIG. 4A is a partially detailed cross sectional view of the rotary wedge gate valve in FIG. 4, generally taken along 4A—4A showing the valve in the closed position.

In FIGS. 4, 4A another embodiment of the rotary wedge gate valve is shown as constructed in accordance with the present invention and the valve is shown in the closed position. This embodiment in FIGS. 4, 4A combines the advantages of some features of the valve assemblies 100, 200 in FIGS. 1, 1A and FIGS. 2, 2A respectively. For the sake of brevity only relevant details are explained below for FIGS. 4, 4A.

In FIGS. 4, 4A, the valve assembly 400 comprises a flow control member 420 which comprises a wedge gate 424 with a solid portion 425 to close the fluid flow passageway 412–414. The wedge gate 424 comprises a convex outer sealing surface 450 that is inclined to the inner concave sealing surface 448. The convex sealing surface 450 is disposed adjacent the valve body seating surface 442 and the concave sealing surface 448 is disposed adjacent to the valve body seating surface 440. The wedge gate 424 wedges into the valve body seating surfaces 440, 442 to seal the fluid flow passageway 412–414 from the valve body cavity 418.

The gate 424 is actuated by the stem 422. The lower end of the stem 422 is connected to a toothed pinion 432 which engages an arcuate toothed rack 430 on the inside upper rim of the rotary gate 424. The stem 422 is operatively connected with the valve operator handle (not shown) by means of a Lift-and-Turn mechanism or a Lift-Turn-and-Reseat mechanism—as explained for FIGS. 2, 2A, which pushes the pinion 432 onto the gate detent 426 thereby wedging the gate 424 into the valve body seating surfaces 440, 442. When the stem 422 is lifted a limited extent, the valve body seats are relieved of the wedging load and this facilitates rotation of the gate 424. The rotary motion of the stem 422 causes the gate 424 to rotate by virtue of the toothed engagement between the pinion 432 and the gate rack 430. Fluid pressure acting on the inclined surface 450 of the gate exerts a vertical force on the gate in the direction parallel to the stem axis. This force helps push the gate away from the valve body seating surfaces 440, 442 thereby relieving the wedging load on the gate and facilitate its rotation.

The operating radius of the rack 430 is greater than the operating radius of the pinion 432 so that the gate 424 rotates about an axis parallel to and offset from the stem axis. This permits the use of a larger gate for larger pipe diameter valves without increasing the size of the pinion. Thus a larger gate can be used for larger pipe diameter valves without proportionately increasing the overall size of the valve assembly, as explained for FIGS. 1,1A. Different kinds of Lift-and-Turn mechanisms can be used on the valve assembly 400 as explained for FIGS. 2, 2A.

In FIGS. 4, 4A only one gate 425 is shown engaging the pinion 432. In fact, the pinion 432 can also engage another gate identical to the gate 425 but oppositely disposed on the opposite side of the pinion across the diameter—in a fashion similar to FIG. 3, causing the two gates to move in opposite directions across the fluid flow-path 412–414. With the use of two gates the fluid flow passageway can be sealed from the valve body cavity at four locations along the fluid flow-path. With two gates engaged by the pinion on opposite sides across the diameter, the forces on the flow control means and the pinion are more evenly distributed than when only one gate is engaged by the pinion on one side only. Therefore with two gates uneven wear will be reduced.

Figure 5:
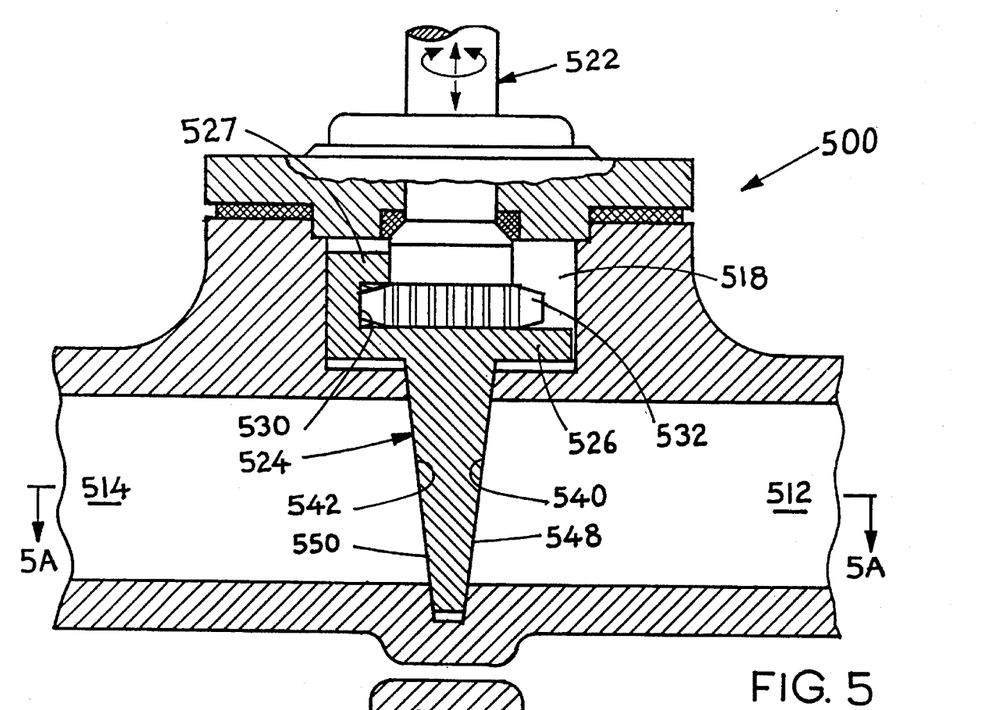
FIG. 5 is a partially detailed cross sectional view of a reciprocating wedge gate valve structure constructed in accordance with the present invention.
Figure 5A:
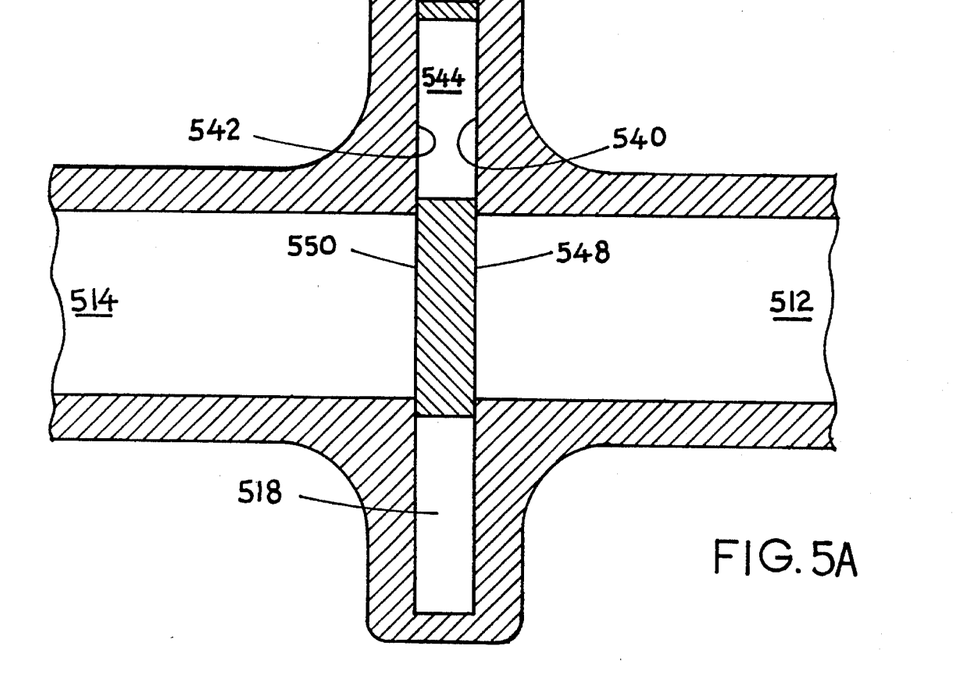
FIG. 5A is a partially detailed cross sectional view of the reciprocating wedge gate valve in FIG. 5, generally taken along 5A—5A showing the valve in the closed position.

In FIGS. 5,5A another embodiment of the wedge gate valve is shown as constructed in accordance with the present invention and the valve is shown in the closed position.

Most of the features in FIGS. 5,5A are explained in other FIGS. 1,1A to 4,4A and for the sake of brevity, only relevant details are explained below for FIGS. 5,5A. The rack 530 on the gate 524 in FIG. 5 is a linearly straight rack which is engaged by the pinion 532. Therefore, the gate 524 reciprocates. in a direction transverse to the fluid flow-path 512–514 and also transverse to the stem axis. In addition to a lower detent 526 to push the gate 524 into the valve body seating surfaces 540, 542, an upper detent 527 is provided overhanging onto the top of the pinion 532 in order to pull up the gate 524 away from the valve body seating surfaces. Of course, fluid pressure acting on the inclined planar surfaces 548, 550 of the gate 524 exerts a vertical force on the gate 524 parallel to the stem axis. This force helps the gate 524 to move upwards away from the valve body seating surfaces thereby relieving the wedging load for facilitating the reciprocating movement of the gate 524. The stem 522 is operatively connected with the valve operator handle (not shown) by means of a Lift-and-Turn mechanism or a Lift-Turn-and-Reseat mechanism. The axial motion of the stem 522 causes wedging and unwedging of the gate 524 and the rotary motion of the stem 522 causes the gate 524 to reciprocate in a direction transverse to the stem axis. A Lift-and-Turn motion for the stem is used for sealing the fluid flow passageway from the valve body cavity in the fluid flow closed position of the valve. A Lift-Turn-and-Reseat mechanism for the stem is used for sealing the fluid flow passageway from the valve body cavity in the fluid flow closed position as well as fluid flow open position of the valve. It should be remembered here that the sealing surfaces 548 and 550 of the gate 524 in FIGS. 5,5A are planar surfaces, since the gate reciprocates in a direction transverse to the stem axis. In FIGS. 1,1A to 4,4A the sealing surfaces of the gate are convex and concave, since the gate is of the rotary type.

It is interesting to know that the valve assembly 500 in FIGS. 5,5A is the culmination of various features progressively added from FIG. 1 to FIG. 4 which are rotary valves. But the valve assembly 500 in FIG. 5,5A is a reciprocating wedge gate valve in which the wedge gate reciprocates in a direction transverse to the stem axis. Generally, a reciprocating wedge gate valve is understood to mean a valve in which the wedge gate reciprocates along the stem axis between the closed and open positions of the valve. As the radius of the gate rack 430 in FIGS. 4,4A is increased infinitely, the gate 424 transforms into a gate that reciprocates in a linear direction transverse to the stem axis, culminating into a reciprocating gate 524 of FIGS. 5,5A. In short, the rotary wedge gate valve of FIGS. 1–4 is transformed into a reciprocating wedge gate valve of FIG. 5 by making the gate rack straight. Different kinds of Lift-and-Turn mechanisms can also be used on the valve assembly 500 as explained for FIGS. 2,2A. In one such version of a Lift-and-Turn mechanism, the stem 522 does not move axially. But a stem extension is attached to the upper end of the stem 522. This stem extension moves axially relative to the stem 522 and the connection between the stem 522 and the extension is such that there is no rotary movement between the stem 522 and the extension which is operatively connected with the valve operator handle by means of a Lift-and-Turn mechanism. There is a stop means disposed onto the stem 522 to arrest axial movement of the stem extension towards the stem 522 thereby transmitting the axial force from the stem extension to the stem 522 for better sealing. By using a Lift-Turn-and-Reseat mechanism on the stem extension, the fluid flow passageway can be sealed from the valve body cavity in fluid flow open position of the valve when the fluid flow opening 544 is aligned with the fluid flow path 512–514.

In FIGS. 5, 5A, only one gate 524 is shown engaging the pinion 532. In fact, here again the pinion 532 can also engage another gate identical to the gate 524 but oppositely disposed on the opposite side of the pinion across the diameter—in a fashion similar to FIG. 3, causing the two gates to reciprocate in opposite directions across the fluid flow-path 512–514. With use of two gates, the fluid flow passageway can be sealed from the valve body cavity 518 at four locations along the fluid flow-path 512–514.

In FIGS. 5,5A the gate is engaged to the pinion on one side only. The gate can be split in the middle into two identical halves along a plane parallel to the stem axis and each half provided with a toothed rack to engage the pinion. The two half gates when placed back-to-back in opposite directions between the two valve body seating surfaces, can engage the pinion on opposite sides of the pinion across the diameter. When the pinion is rotated, the two half gates will reciprocate synchronously in opposite directions across the fluid flow-path in a direction transverse to the stem axis with the backs of the gates sliding against each other. With this construction of two half gates engaging the pinion on both sides, the forces on the flow control means and the pinion are more evenly distributed than when only one gate is engaged by the pinion on one side only and the uneven wear will be reduced.

In FIG. 5 the gate sealing surfaces 548, 550 are shown inclined to each other. When these sealing surfaces are disposed parallel to each other, the gate functions like a traditional slab gate with parallel sides but one in which the slab gate reciprocates in a direction transverse to the stem axis as opposed to the traditional slab gate valve in which the slab gate reciprocates along the stem axis. This change in direction from reciprocation along the stem axis to the reciprocation transverse to the stem axis is brought about by the rack-and-pinion arrangement disclosed by the instant invention.

In all FIGS. 1–5, the valve body cavity is correspondingly shaped to closely surround the gate so as to keep the dead cavity space in the valve body cavity to the absolute minimum. This is important for sanitary applications.

The present invention is well adapted to carry out the objects and to attain the ends and advantages mentioned as well as those inherent therein. While presently preferred embodiments of the invention have been described for purposes of this disclosure, it will be recognized that numerous changes can be made which readily suggest themselves to those skilled in the art and which are encompassed within the spirit of the invention disclosed as defined in the appended claims.

What is claimed:

1. A valve comprising:
    a valve body having a fluid flow passageway defining a fluid flow path through the valve body and having a body cavity in the fluid flow path, the valve body having a pair of seating surfaces surrounding the fluid flow passageway and facing each other across the body cavity;
    a flow control means disposed in the body cavity for selectively closing or opening the fluid flow passageway, the flow control means comprising:
        a gate having a convex surface facing one seating surface and a concave surface facing the second seating surface, the surfaces being disposed concentric with each other and at least one of the surfaces disposed inclined to the fluid flow path, the valve body cavity correspondingly shaped to closely surround the flow control means and to permit the flow control means to rotate about and to move axially along an axis transverse to the fluid flow path; and
    a valve operator means connected to the flow control means for selectively moving the flow control means, the valve operator means comprising:
        a valve operator;
        a stem having a stem axis and a stem diameter, the stem connected to the flow control means by a connecting means that permits substantially no rotary movement between the stem and the flow control means; and
        a stem moving means operatively connected with the valve operator for selectively moving the stem, said stem moving means causing a rotary movement of the flow control means for selectively closing or opening the fluid flow passageway and further causing the stem to move axially to force the flow control means to wedge against the seating surface facing the inclined surface of the gate for sealing about the fluid flow passageway.

2. The valve of claim 1 wherein:
    the connecting means between the flow control means and the stem comprises a rack and pinion arrangement between the flow control means and the stem.

3. The valve of claim 1 wherein:
    the stem moving means comprises a lift and turn means for causing only an axial movement of the stem during a limited interval of movement of the valve operator and for causing a rotary movement of the stem at a time of movement of the valve operator other than the limited interval.

4. The valve of claim 1 wherein:
    the flow control means comprises a fluid flow opening therethrough alignable with the fluid flow passageway.

5. The valve of claim 1 wherein:
    the inclined surface of the gate is formed from the frustum of a cone.

6. The valve of claim 1 wherein:
    the connecting means between the stem and the flow control means comprises means for causing the flow control means to rotate about an offset axis parallel to the stem axis.

7. The valve of claim 6 wherein:
    the connecting means between the flow control means and the stem comprises a rack and pinion arrangement between the flow control means and the stem.

8. The valve of claim 1 wherein:
    the connecting means between the stem and the flow control means comprises means for causing the flow control means to rotate about an offset axis parallel to the stem axis and offset from the stem axis by a distance that is at least one hundred times the stem diameter.

* * * * *